(12) United States Patent
Kurosawa (10) Patent No.: US 7,366,409 B2
(45) Date of Patent: Apr. 29, 2008

(54) DIAL POSITION CHANGING DEVICE OF A CAMERA

(75) Inventor: Yuichi Kurosawa, Tokyo (JP)

(73) Assignee: PENTAX Corporation, Tokyo (JP)

( * ) Notice: Subject to any disclaimer, the term of this patent is extended or adjusted under 35 U.S.C. 154(b) by 290 days.

(21) Appl. No.: 11/073,591

(22) Filed: Mar. 8, 2005

(65) Prior Publication Data
US 2005/0201746 A1   Sep. 15, 2005

(30) Foreign Application Priority Data
Mar. 9, 2004   (JP)   .............................. 2004-065235

(51) Int. Cl.
*G03B 17/00* (2006.01)
(52) U.S. Cl. .................................... 396/543
(58) Field of Classification Search ................ 396/543, 396/299
See application file for complete search history.

(56) References Cited

U.S. PATENT DOCUMENTS 5,448,334 A * 9/1995 Kaihara et al. ............. 396/297
5,745,809 A * 4/1998 Kawahata ................... 396/287
6,067,424 A * 5/2000 Shono ........................ 396/297
6,459,856 B2 * 10/2002 Kawano ..................... 396/287
2002/0089591 A1 * 7/2002 Kurahashi ................... 348/207

FOREIGN PATENT DOCUMENTS

JP    2003-45292    2/2003

OTHER PUBLICATIONS

English Language Abstract of JP 2003-45292.

* cited by examiner

*Primary Examiner*—Christopher Mahoney
(74) *Attorney, Agent, or Firm*—Greenblum & Bernstein, P.L.C.

(57) ABSTRACT

A camera includes a dial body provided on a camera body to be manually rotatable; and a manual operation device, provided on the camera body separately from the dial body, for rotating the dial body.

24 Claims, 10 Drawing Sheets

DIAL POSITION CHANGING DEVICE OF A CAMERA

BACKGROUND OF THE INVENTION

1. Field of the Invention

The present invention relates to a dial position changing device of a camera for changing the rotational position of a dial switch such as a mode select dial directly or indirectly which is used for selecting, e.g., a desired exposure mode from among various exposure modes.

2. Description of the Prior Art

Cameras having a mode select dial for selecting an exposure mode from among various exposure modes such as programmed AE (auto exposure) mode, aperture priority AE mode and shutter priority AE mode are known in the art. The mode select dial is usually provided on top of a camera body, and accordingly, the position (rotational position) of the mode select dial can be visually checked by looking at the mode select dial from above the camera body. For instance, in the camera disclosed in Japanese laid-open patent publication 2003-45292, the mode select dial is located on a top surface of a top cover of a camera body, and accordingly, it is difficult to visually check the position of the mode select dial when the user cannot look at the mode select dial from above the camera body, for instance, when the camera is held at or above eye level by hand or with a tripod. On this account, there is a possibility of the user releasing a shutter in an unintentional exposure mode with the mode select dial being set at a wrong exposure mode, thereby resulting in an incorrect exposure. Specifically, in digital cameras produced in recent years, a display monitor such as an LCD panel is provided on the back of the camera, and accordingly the user seldom looks at the camera body from above when taking pictures while viewing object images indicated on the display monitor, which becomes a cause of the above described problem.

In recent years digital cameras having a mode select dial which is operated not only for selecting an exposure mode from among various exposure modes such as mentioned above but also for selecting a setting mode from among various setting modes (e.g., white balance setting mode, ISO speed setting mode and image quality setting mode) in which predetermined settings on the camera need to be determined before making an exposure have been proposed. In this type of digital camera, it is sometimes the case that the user forgets to select a desired exposure mode by operating the mode select dial after selecting a setting mode from various setting modes such as mentioned above by operating the mode select dial. In this case, even if a release button is depressed, a photographing operation (exposure operation) is not carried out, so that the user may miss a chance of releasing the shutter at the right moment.

To prevent such a problem from occurring, it is possible to make a display monitor on a camera body indicate the currently-selected setting mode and exposure mode in the case of a digital camera to call attention to the user the currently-selected setting mode and exposure mode. In this case, it is also possible to make a portion of the display monitor indicate the current position of the mode select dial. This makes it possible to overcome at least the above described problem of depressing a release button with the mode select dial remaining set at a wrong exposure mode or with the mode select dial remaining forgotten to be operated to select an exposure mode.

However, even if the currently-selected setting mode and exposure mode and/or the current position of the mode select dial is indicated on the display monitor, it is still necessary for the user to operate the mode select dial by bringing either hand to a top part of the camera body at which the mode select dial is located when the user notices from the indication on the display monitor that the mode select dial is currently set at a wrong position. This sometimes makes the camera difficult to operate. Moreover, it is sometimes the case that either hand of the user cannot reach the mode select dial on top of the camera body during photography, and therefore cannot operate the mode select dial, which is an undesirable operability problem of the camera. To overcome this problem, it is also possible to provide an additional mode select dial having the same or similar function as the original mode select dial. However, this complicates the structure of the camera, especially the structure of the electric circuit for interconnecting these mode select dials, and an additional problem arises with the camera design.

SUMMARY OF THE INVENTION

The present invention provides a dial position changing device of a camera which makes it possible for a dial such as a mode select dial of the camera to be rotated by operating a different manual operation device provided independently of the dial.

According to an aspect of the present invention, a camera is provided, including a dial body provided on a camera body to be manually rotatable; and a manual operation device, provided on the camera body separately from the dial body, for rotating the dial body.

It is desirable for the camera to include a dial position detector for detecting a rotational position of the dial body, and an indicator for visually indicating information on the rotational position of the dial body which is detected by the dial position detector. The manual operation device is provided on the camera body at a position so as to be capable of being operated while allowing a user to view both the manual operation device and the information on the indicator at the same time.

It is desirable for the dial body to serve as a mode select dial for selecting a desired mode from among a plurality of modes.

It is desirable for the plurality of modes to include different exposure modes and different setting modes.

It is desirable for the dial body to be provided on top of the camera body, and for the manual operation device and the indicator to be provided on a back surface of the camera body.

It is desirable for the dial position detector to include a slidable contact brush fixed to a portion of a periphery of the dial body; and a wiring board provided along a circumference of the dial body and having a pattern of conductors with which the slidable contact brush comes into sliding contact, wherein a state of conduction among the conductors changes in accordance with a change in the rotational position of the dial body.

It is desirable for the indicator to include an LCD which indicates object images captured by an image pick-up device.

It is desirable for the camera to be a digital camera having an image pick-up device.

It is desirable for the manual operation device to include a manual operation button positioned in a close vicinity of the LCD.

It is desirable for the wiring board to include flexible printed wiring board.

In another embodiment, a camera is provided, including a dial body provided on a camera body to be manually rotatable, a dial driving device for driving the dial body, and a manual operation device for actuating the dial driving device when operated.

It is desirable for the camera to include a dial position detector for detecting a rotational position of the dial body, and an indicator for visually indicating information on the rotational position of the dial body which is detected by the dial position detector. The manual operation device is provided on the camera body at a position so as to be capable of being operated while allowing a user to view both the manual operation device and the information on the indicator at the same time.

It is desirable for the camera to include a clutch for making the dial driving device engaged and disengaged with the dial body to allow rotation of the dial driving device to be transferred to the dial body and to prevent the rotation of the dial driving device from being transferred to the dial body, respectively.

It is desirable for the clutch to include a rotatable member rotated by the dial driving device; a plurality of recesses formed circumferentially on one of the rotatable member and the dial body; and a click ball provided on the other of the rotatable member and the dial body to be selectively engaged in the plurality of recesses via a biasing device.

It is desirable for the dial driving device to include one of a DC motor and a stepper motor which rotates the dial body via a gear mechanism.

The dial driving device can be an ultrasonic motor, positioned coaxially with the dial body, for directly driving the dial body.

It is desirable for the dial position detector to include a slidable contact brush fixed to a portion of a periphery of the dial body; and a wiring board provided along a circumference of the dial body and having a pattern of conductors with which the slidable contact brush comes into sliding contact, wherein a state of conduction among the conductors changes in accordance with a change in the rotational position of the dial body.

It is desirable for the dial body to serve as a mode select dial for selecting a desired mode from among a plurality of modes.

It is desirable for the plurality of modes to include different exposure modes and different setting modes.

It is desirable for the dial body to be provided on top of the camera body, and for the manual operation device and the indicator to be provided on a back surface of the camera body.

It is desirable for the indicator to include an LCD which indicates object images captured by an image pick-up device.

It is desirable for the rotatable member to include a gear positioned immediately below the dial body.

It is desirable for the dial driving device to include a motor for driving the dial body, and for the rotatable member to include a gear positioned immediately below the dial body to be engaged with the motor via at least one reduction gear.

It is desirable for the biasing device to include a compression coil spring accommodated in an accommodation hole formed on the dial body.

According to the present invention, a dial such as a mode select dial can be rotated by operating a different manual operation device provided independently of the dial. This makes it possible to rotate the dial by operating the manual operation device which is located on, e.g. the back of the camera, even if the dial is located on top of the camera, thus improving the operability of the camera. In addition, the dial can be rotated to be set at a desired rotational position by detecting the rotational position of the dial by the dial position detector, making the indicator indicate this rotational position, and operating the manual operation device while visually checking the rotational position indicated on the indicator.

The present disclosure relates to subject matter contained in Japanese Patent Application No. 2004-65235 (filed on Mar. 9, 2004) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
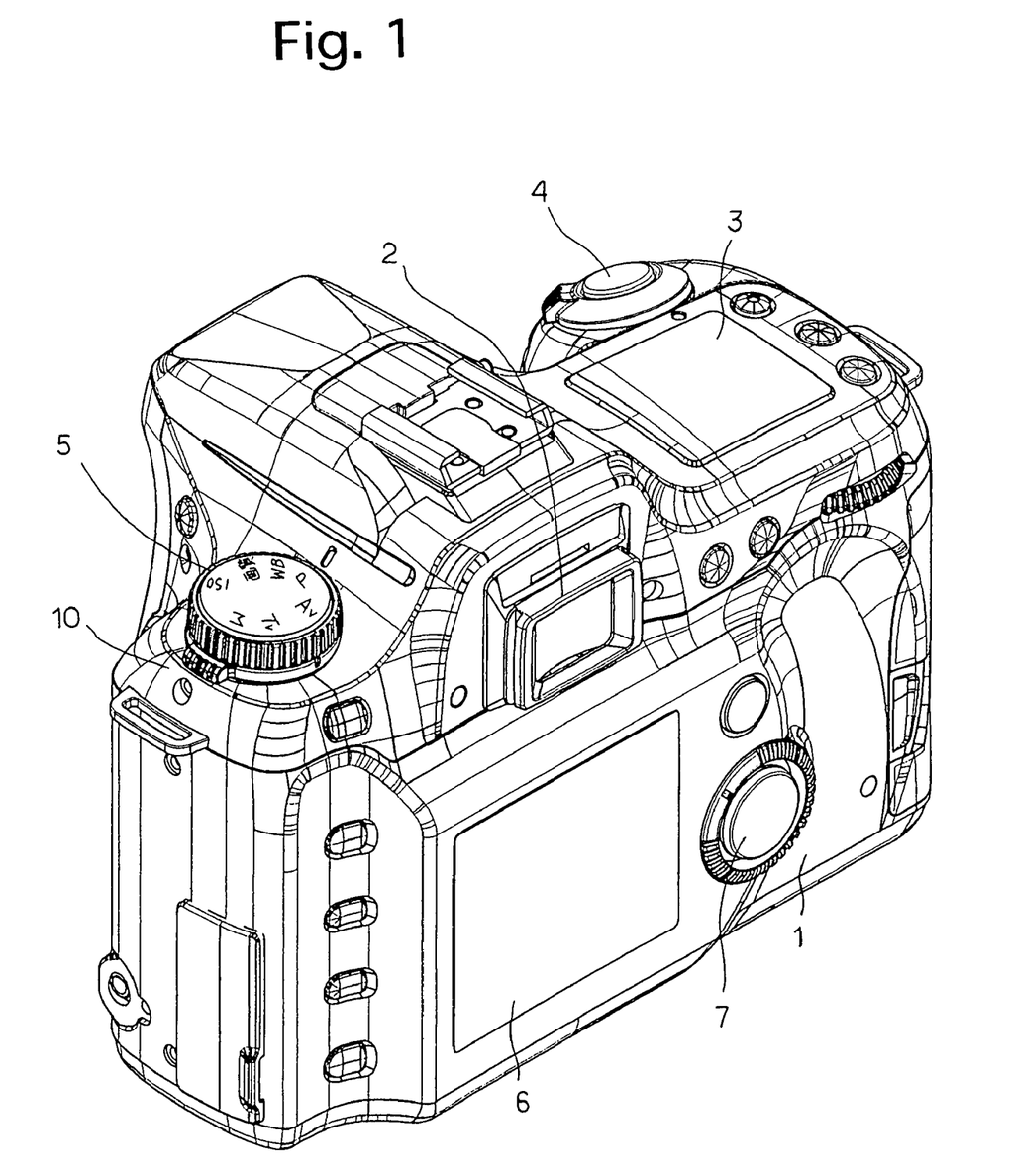
FIG. 1 is perspective view of an embodiment of a digital camera according to the present invention, viewed obliquely from behind the camera.

A digital camera shown in FIG. 1 is constructed as an SLR digital camera using an interchangeable photographing lens 11 (schematically shown in FIG. 7) which is detachably attached to the front of a camera body 1. The camera body 1 is provided on a top decorative member 10 with an eyepiece (eyepiece window) 2, an LCD indicator portion 3, a release button 4 and a mode select dial (dial switch) 5. The camera body 1 is provided on the back thereof with an LCD monitor (indicator) 6, on which captured object images and various pieces of information on exposure modes and settings on the camera such as the currently-selected exposure mode and setting mode can be indicated, and is provided adjacent to the LCD monitor 6 with a mode select button (manual operation button/manual operation device) 7. In the illustrated embodiment of the digital camera shown in FIG. 1, a desired mode (exposure mode or setting mode) can be selected from among various exposure modes and various setting modes by manually turning the mode select dial 5;

moreover, a desired exposure or setting mode can be selected from among the same various exposure modes and the same various setting modes by pressing the mode select button 7.

Figure 2:
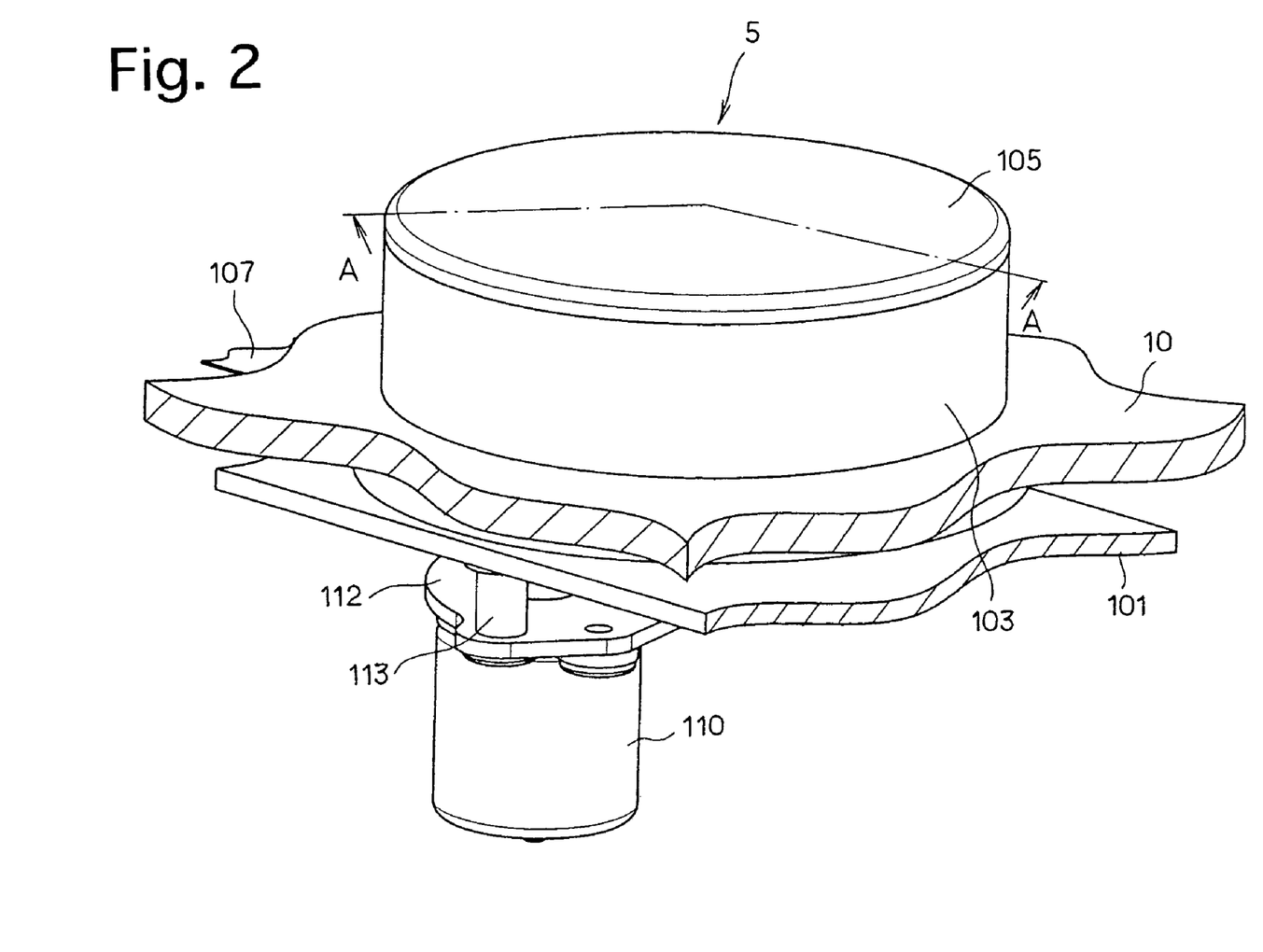
FIG. 2 is a cutaway perspective view of a portion of the digital camera shown in FIG. 1, showing a first embodiment of a mode select dial provided on the digital camera.
Figure 3:
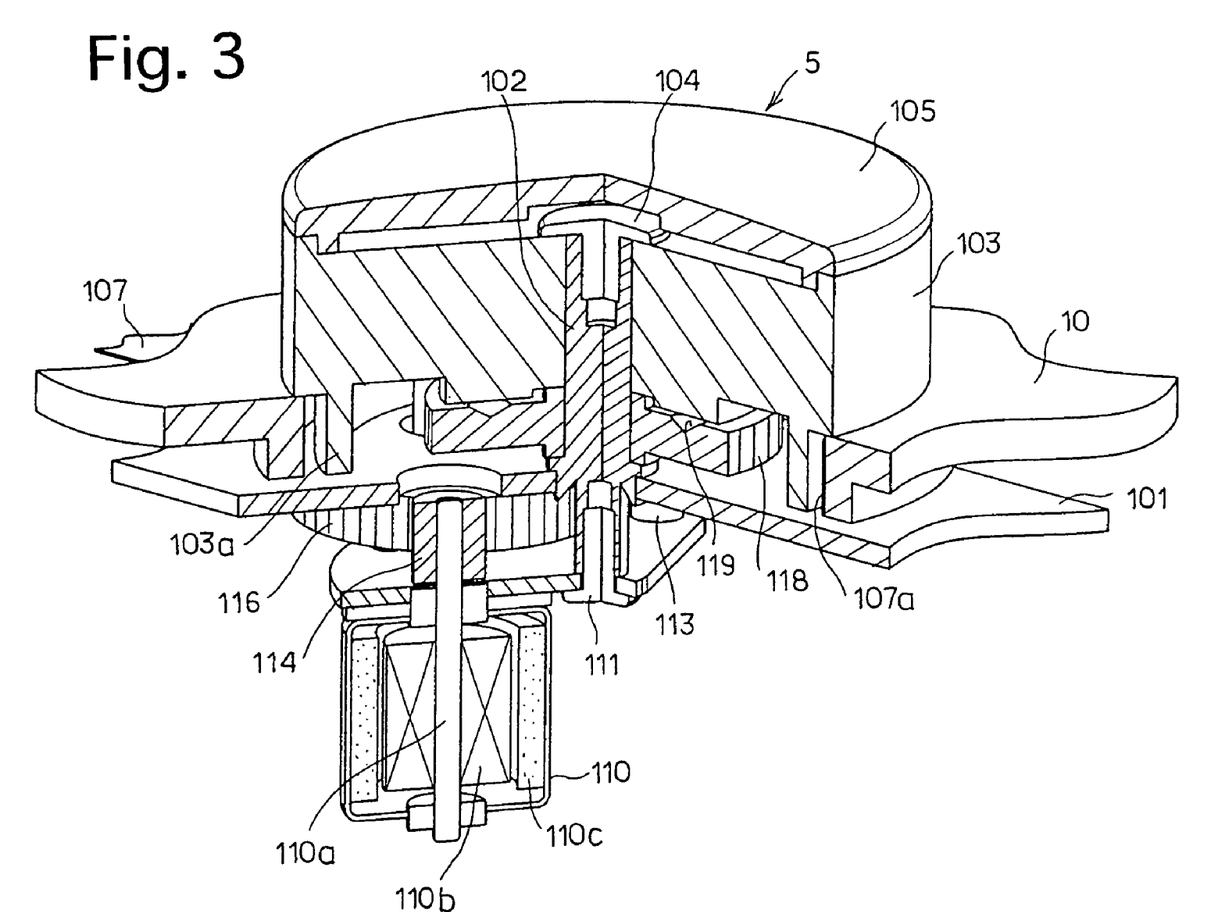
FIG. 3 is a cutaway perspective view, partly in cross section taken along A-A line in FIG. 2, of the mode select dial shown in FIG. 2.
Figure 4:
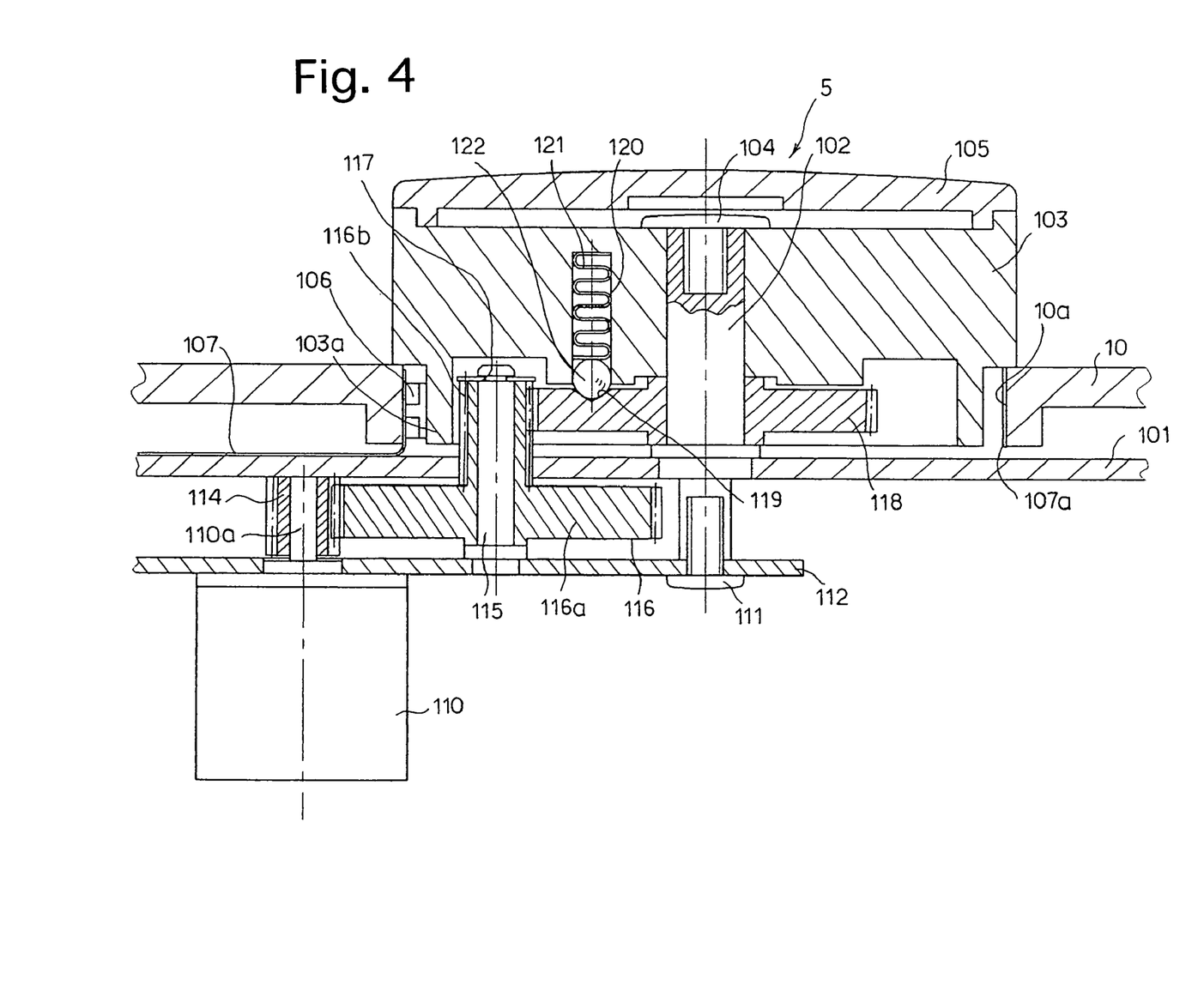
FIG. 4 is a cross sectional view of the mode select dial shown in FIGS. 2 and 3.

FIG. 2 is a cutaway perspective view of a portion of the digital camera shown in FIG. 1, showing a first embodiment of the mode select dial 5, FIG. 3 is a cutaway perspective view, partly in cross section taken along A-A line in FIG. 2, of the mode select dial 5, wherein substantially one third (120 degrees) of the mode select dial 5 is cut away, and FIG. 4 is a cross sectional view of the mode select dial 5. The top decorative member 10 of the camera body 1 is provided with a circular opening 10a (see FIG. 4), and is provided, inside the top decorative member 10 below the opening 10a, with an internal wall 101 of the camera body 1 which is exposed to the outside of the top decorative member 10 through the opening 10a. A primary shaft 102 is fixed to the internal wall 101 to extend substantially vertically upwards at the center of the opening 10a. A dial body 103 in the shape of a thick disc is loosely fitted on the primary shaft 102 to be manually rotatable on the primary shaft 102. A set screw 104 is screwed into the upper end of the primary shaft 102 to prevent the dial body 103 from coming off the primary shaft 102, and a decorative disc 105 is bonded to an upper surface of the dial body 103 to cover up the head of the set screw 104. The decorative disc 105 is provided, on a top surface thereof at substantially equi-angular intervals around the border of the decorative disc 105, with seven different markings (e.g., printed or engraved markings): "P", "Av", "Tv", "B", "ISO", "IQ" and "WB", as shown in FIG. 1, so that the mode select dial 5 has seven switching positions. The four markings "P", "Av", "Tv" and "B" represent four different exposure modes: programmed AE mode, aperture-priority AE mode, shutter-priority AE mode and bulb mode, respectively. The remaining three markings "ISO", "IQ" and "WB" represent three different setting modes: ISO speed setting mode, image quality (image size) setting mode and white balance setting mode, respectively.

Figure 5A:
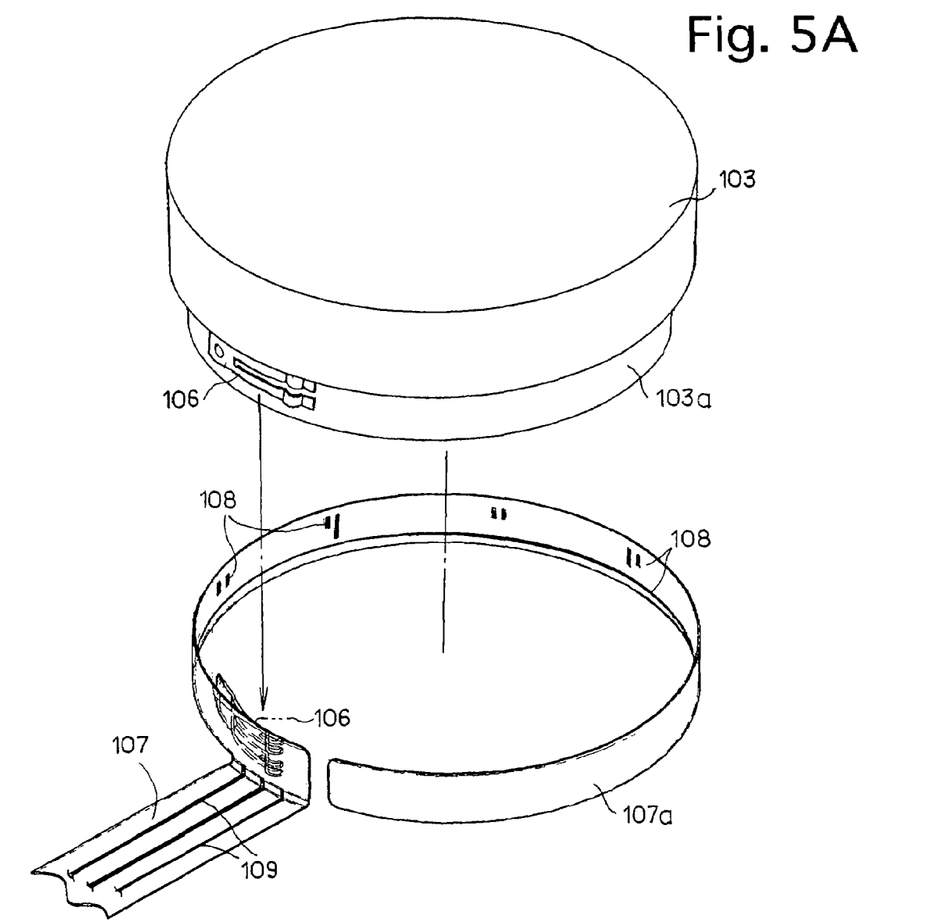
FIG. 5A is an exploded perspective view of a portion of the mode select dial, showing elements of a dial position detector.
Figure 5B:
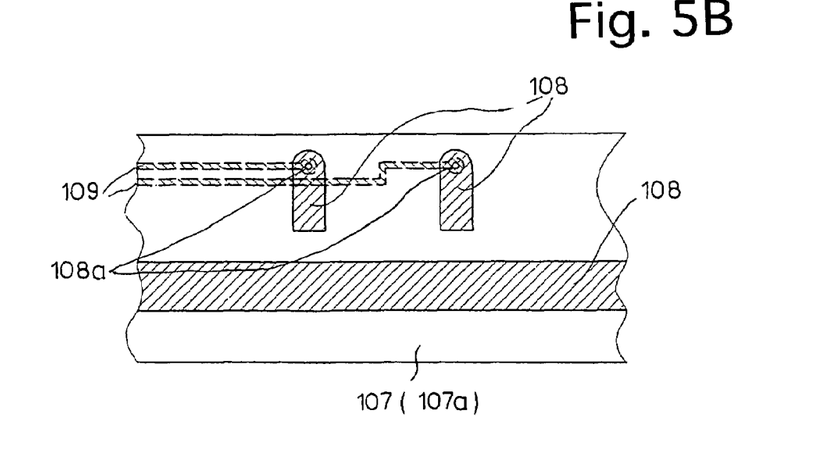
FIG. 5B is a developed view of a portion of an element of the dial position detector shown in FIG. 5A.

A bottom portion of the dial body 103 is formed as a sleeve portion (cylindrical portion) 103a having a diameter slightly smaller than the diameter of the dial body 103. The sleeve portion 103a is inserted into the opening 10a from the outside of the decorative top member 10. As shown in FIG. 5A, a slidable contact brush 106 made of resilient conductive metal is fixed to an outer peripheral surface of the sleeve portion 103a. The digital camera is provided in the camera body 1 with a flexible PWB (printed wiring board) 107 which is installed on the upper surface of the internal wall 101 to be supported thereby, and the flexible PWB 107 is provided at one end thereof with a cylindrical-shaped portion 107a which is shaped by rolling a narrow strip portion of the flexible PWB 107. The cylindrical-shaped portion 107a is installed on an inner peripheral surface of the opening 10a of the top decorative member 10 so that the inner peripheral surface of the cylindrical-shaped portion 107a is radially opposed to the outer peripheral surface of the sleeve portion 103a. The cylindrical-shaped portion 107a is provided on the inner peripheral surface thereof with a pattern of conductors 108 with which the slidable contact brush 106 comes into sliding contact. The slidable contact brush 106 slides on the pattern of conductors 108 when the dial body 103 is manually turned. The pattern of conductors 108 is formed in association with the aforementioned seven switching positions of the mode select dial 5 so that the state of conduction among conductors of the pattern 108 changes stepwise in accordance with variations in rotational position (dial position) of the dial body 103. This structure makes it possible to detect the seven switching positions of the mode select dial 5. The slidable contact brush 106 and the pattern of conductors 108 constitute a dial position detector 211 shown in FIG. 7. The conductors of the pattern 108, which are formed on the inner peripheral surface of the cylindrical-shaped portion 107a of the flexible PWB 107, are partly extended radially outwards via formation of through-holes 108a (see FIG. 5B) so that the pattern 108 is electrically connected to printed wiring conductors 109, which are formed on the outer peripheral surface of the cylindrical-shaped portion 107a and the top surface of an adjacent portion of the flexible PWB 107, to be electrically connected to the circuitry of the digital camera shown in FIG. 7. Accordingly, the conductors of the pattern 108 are electrically connected to the circuitry shown in FIG. 7 via the through-holes 108a and the printed wiring conductors 109.

On the other hand, the digital camera is provided below the dial body 103 with a dial driving system (dial driving device) 212 (see FIG. 7). The dial driving system 212 is provided with a DC motor 110 which serves as a driving source for electrically rotating the mode select dial 5. A motor mounting plate 112 is fixed to the lower end of the primary shaft 102 by a set screw 111, while the DC motor 110 is positioned below the internal wall 101 and fixed to the motor mounting plate 112 to be supported thereby via fixing columns 113 (see FIGS. 2 and 3) which are provided between the internal wall 101 and the motor mounting plate 112 to be held therebetween. A rotary shaft 110a of the DC motor 110 extends upward from the motor mounting plate 112, and a pinion gear 114 is fixed on the rotary shaft 110a. The DC motor 110 is provided therein with a rotor 110b and a stator 110c as shown in FIG. 3. The DC motor 110 is a conventional type, and therefore the structure of the DC motor 110 will not be hereinafter discussed in detail. A shaft 115 is fixed to the upper surface of the motor mounting plate 112 to extend upward to be parallel to the rotary shaft 110a. A reduction gear 116 which is in mesh with the pinion gear 114 is fitted on the shaft 115 to be rotatable thereon, and a retaining ring (circlip) 117 (see FIG. 4) is snapped into a groove formed in the shaft to prevent the reduction gear 116 from coming off the shaft 115. The reduction gear 116 is formed as a double gear having a large-diameter gear portion 116a and a small-diameter gear portion 116b which are formed integral with each other on the same axis of rotation. The large-diameter gear portion 116a remains in mesh with the pinion gear 114, while the small-diameter gear portion 116b remains in mesh with a clutch gear 118. The clutch gear 118 serves as a rotatable member which is positioned immediately below the dial body 103 and loosely fitted on the primary shaft 102 to be rotatable thereon. The pinion gear 114, the reduction gear 116 and the clutch gear 118 constitute a gear mechanism for transferring rotation of the DC motor 110 to the dial body 103.

Figure 6:
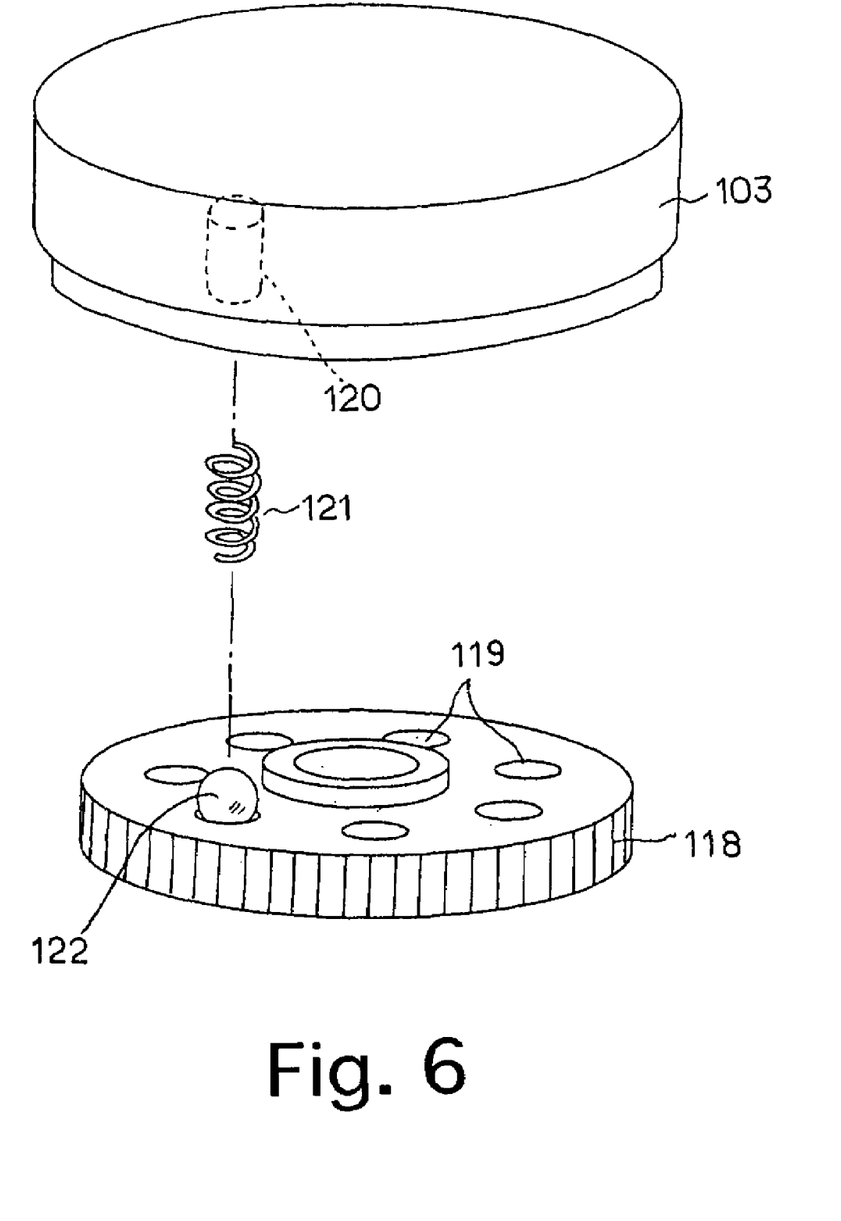
FIG. 6 is an exploded perspective view of a clutch mechanism.

The clutch gear 118 can rotate on the primary shaft 102 independently of the dial body 103, and is connected to the dial body 103 via a clutch mechanism shown in FIG. 6. As shown in FIG. 6, the clutch gear 118 is provided on a top surface thereof with seven click holes (recesses) 119, each having a conical cross section which are circumferentially arranged at equi-angular intervals. As shown in FIGS. 4 and 6, a click ball 122 is installed between the dial body 103 and the clutch gear 118, and is continuously pressed against the top surface of the clutch gear 118 by a compression coil spring (biasing device) 121 so that the click ball 122 can selectively click into the seven click holes 119. The compression coil spring 121 is accommodated in an accommodation hole 120 formed on a bottom surface of the dial body 103. As shown in FIG. 4, the click ball 122 is partly engaged in one click hole 119 by the spring force of the compression coil spring 121, and remains engaged in the click hole 119 to prevent the dial body 103 from rotating relative to the clutch gear 118 if the user intends to rotate the dial body 103 by a force less than the minimum force necessary for the compression coil spring 121 to be compressed. If one intends to rotate the dial body 103 by a force greater than the minimum force, the clutch mechanism is disengaged, so that the dial body 103 rotates on the primary shaft 102 relative to the clutch gear 118. The clutch gear 118, the series of click holes 119, the accommodation groove 120, the compression coil spring 121 and the click ball 122 are elements of the clutch mechanism.

Figure 7:
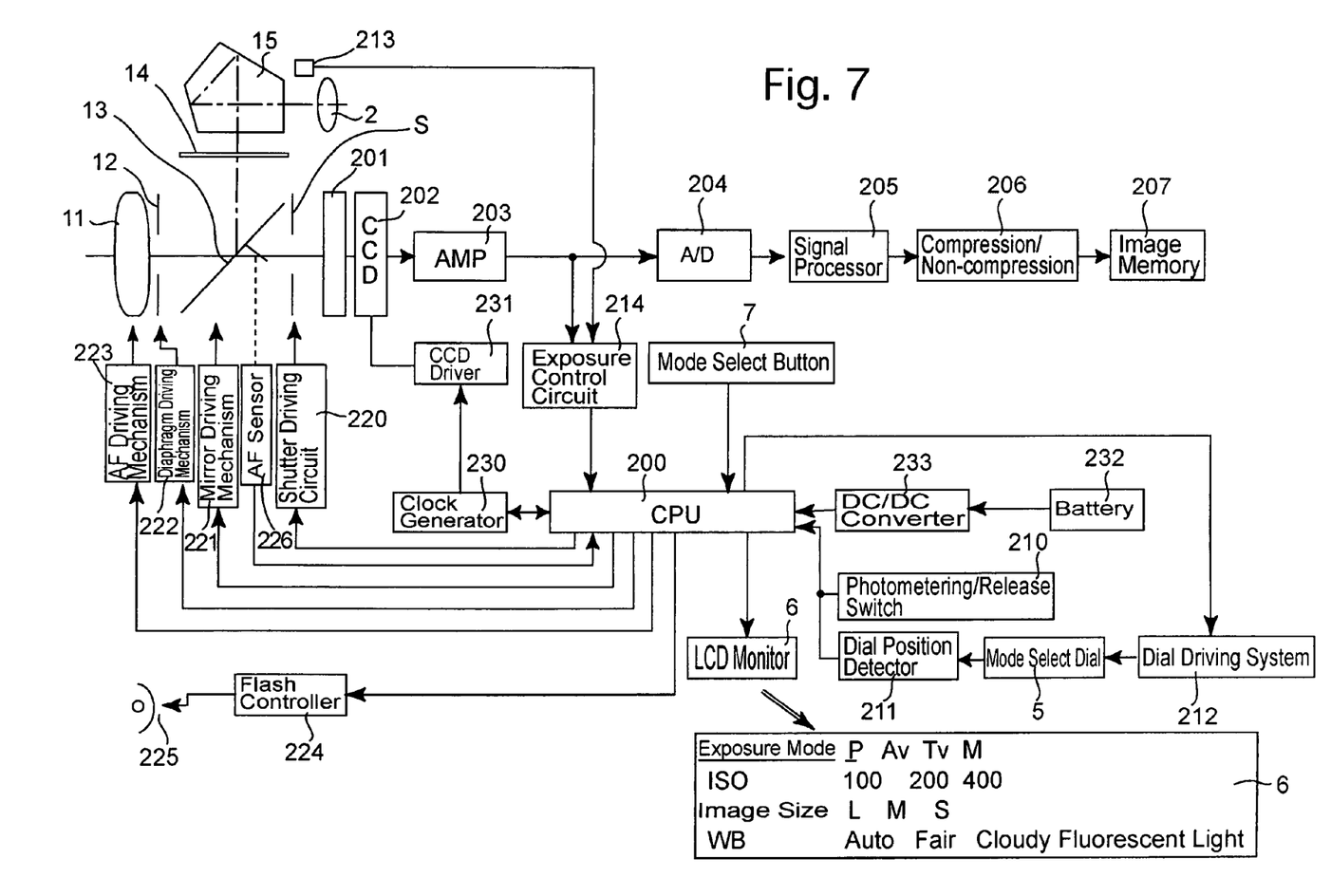
FIG. 7 is a diagrammatic representation of the various components of the digital camera shown in FIG. 1.

FIG. 7 shows a diagrammatic representation of the various components of the digital camera. The digital camera is provided with a CCD image sensor (image pick-up device) 202 which receives a light bundle of an object which is passed through the photographing lens 11 and an optical low-pass filter 201 positioned behind a focal-plane shutter S. An imaging signal output from the CCD image sensor 202 is amplified by an amplifier (AMP) 203, converged into a digital signal by an A/D converter 204, and processed by a signal processing circuit 205 to be output as a required form of signal. Subsequently, this signal is compressed or not compressed by a compressing/non-compressing circuit 206 to be stored in an image memory 207. At the same time, the aforementioned image signal is input to a CPU 200 to be visually displayed on the LCD monitor 6. The CPU 200 comprehensively controls the overall operation of the digital camera.

A switch signal output from a photometering/release switch 210, a dial-position signal output from the dial position detector 211 and a button-status indication signal output from the mode select button 7 are input to the CPU 200. The switch signal is output upon the release button 4 being depressed, the dial-position signal is output immediately after the dial position detector 211 detects the rotational position (dial position) of the mode select dial 5 which is set by either an operation of the dial driving system 212 which is driven by an operation of the mode select button 7 or a manual operation of the mode select dial 5, and the button-status indication signal is output upon the mode select button 7 being pushed. In addition, an exposure signal output from an exposure control circuit 214 and a signal output from an AF sensor 226 are input to the CPU 200. The exposure control circuit 214 controls an exposure operation in accordance with exposure data output from a photometering element 213 and an imaging signal output from the CCD image sensor 202. The photometering element 213 measures the brightness of an object image formed through the photographing lens 11, a diaphragm 12, a movable half mirror 13, a focusing screen 14, a pentagonal prism 15 and other optical elements. In accordance with these signals, the CPU 200 controls operations of a shutter driving circuit 220, a mirror driving mechanism 221, a diaphragm driving mechanism 222 and an AF (autofocus) driving mechanism 223 to perform an imaging operation under established conditions. At this time, the CPU 200 controls the operation of the flash control circuit 224 in accordance with the aforementioned exposure data to bring a flash 225 into operation if necessary. The CPU 200 controls the operation of a clock generator 230 to supply a clock signal to a CCD driver 231 for driving the CCD image sensor 202. Note that a battery 232 and a DC/DC converter 233 are shown in FIG. 7, and that the manner of indication of various settings on the camera on the LCD monitor 6 is also shown in FIG. 7 by way of example.

Operations of the above described digital camera in operating the mode select dial 5 will be discussed hereinafter. When selecting a desired mode (either a photographing mode or a setting mode), the user manually rotates the mode select dial 5. When the mode select dial 5 is manually rotated, the dial body 103 rotates on the primary shaft 102 while the slidable contact brush 106, which is provided on an outer peripheral surface of the sleeve portion 103a, slides on the inner peripheral surface of the cylindrical-shaped portion 107a of the flexible PWB 107. This sliding movement of the slidable contact brush 106 on the cylindrical-shaped portion 107a changes the state of conduction among the conductors of the pattern 108 in accordance with variations in rotational position of the dial body 103, and one of the seven switching positions of the mode select dial 5 is detected by the dial position detector 211 from the current state of conduction among the conductors of the pattern 108. The dial position detector 211 outputs the aforementioned dial-position signal to the CPU 200. The CPU 200 controls associated components and circuits shown in FIG. 7 in accordance with the dial-position signal input from the dial position detector 211, and sets an exposure or setting mode which corresponds to the detected switching position of the mode select dial 5 to make a correct exposure possible.

At this time, the clutch gear 118 which is connected to the DC motor 110 via the reduction gear 116 is prevented from rotating because the DC motor 110 that serves as a driving source of the dial driving system 212 is not actuated. Therefore, manually rotating the dial body 103 at this time causes the clutch mechanism to be disengaged, thus causing only the dial body 103 to rotate on the primary shaft 102 relative to the clutch gear 118 while making the click ball 122 disengaged from one click hole 119 against the spring force of the compression coil spring 121 (by compressing the compression coil spring 121) and engaged in another click hole 119 by the spring force of the compression coil spring 121 in alternative order.

On the other hand, when a photographing operation is carried out with the camera being held at or above eye level, e.g., in the case where the user takes a picture while viewing the object image indicated on the LCD monitor 6, it is difficult to visually check which of the seven markings on the decorative disc 105 of the mode select dial 5 is currently selected by looking at the mode select dial 5 from above the camera body 1 as mentioned above. In this case, the user can check which of the seven markings on the decorative disc 105 is currently selected by reading visual information indicated on the LCD monitor 6, and can change the currently-selected exposure or setting mode to another exposure or setting mode by operating the mode select button 7 as needed. Upon inputting the aforementioned button-status indication signal, i.e., a mode setting signal which is issued upon the mode select button 7 being pressed, the CPU 200 actuates the DC motor 110 of the dial driving system 212 to rotate the pinion gear 114. This rotation of the pinion gear 114 causes the reduction gear 116 to rotate, thus causing the clutch gear 118 that is in mesh with the reduction gear 116 to rotate. This rotation of the clutch gear 118 is transferred to the dial body 103 via the engaging force of the click ball 122 with the currently-associated click hole 119 to engage the clutch mechanism, thus causing the dial body 103 to rotate together with the clutch gear 118 as one body since the dial body 103 is loosely fitted on the primary shaft 102 as mentioned above. Consequently, the slidable contact brush 106 slides on the pattern of conductors 108 of the flexible PWB 107, and the dial position detector 211 detects the dial position of the mode select dial 5. Therefore, the CPU 200 causes the LCD monitor 6 to indicate an exposure or setting mode which corresponds to the detected dial position. At this time, the exposure or setting mode which is indicated on the LCD monitor 6 sequentially changes if the mode select button 7 remains pressed because the dial body 103 continues to rotate if the mode select button 7 remains pressed. Accordingly, the user stops pressing the mode select button 7 so that a desired exposure or setting mode is selected immediately after a desired exposure or setting mode is indicated on the LCD monitor 6.

As can be understood from the above description, the user can rotate the mode select dial 5 to change the rotational position (dial position) thereof to thereby change one exposure or setting mode to another in accordance with the dial-position signal output from the dial position detector 211 not only by directly turning the mode select dial 5 but also by operating the mode select button 7. Therefore, even in the case where the user takes a picture under conditions where they cannot look at the mode select dial 5 from above the camera body 1 and/or where it is difficult for the user to manually rotate the mode select dial 5, the user can easily select and set a desired mode from among various exposure modes and setting modes while visually checking the information on the currently-selected mode indicated on the LCD monitor 6, which makes it possible to perform a photography at correct exposure swiftly and easily.

Second Embodiment

Figure 8:
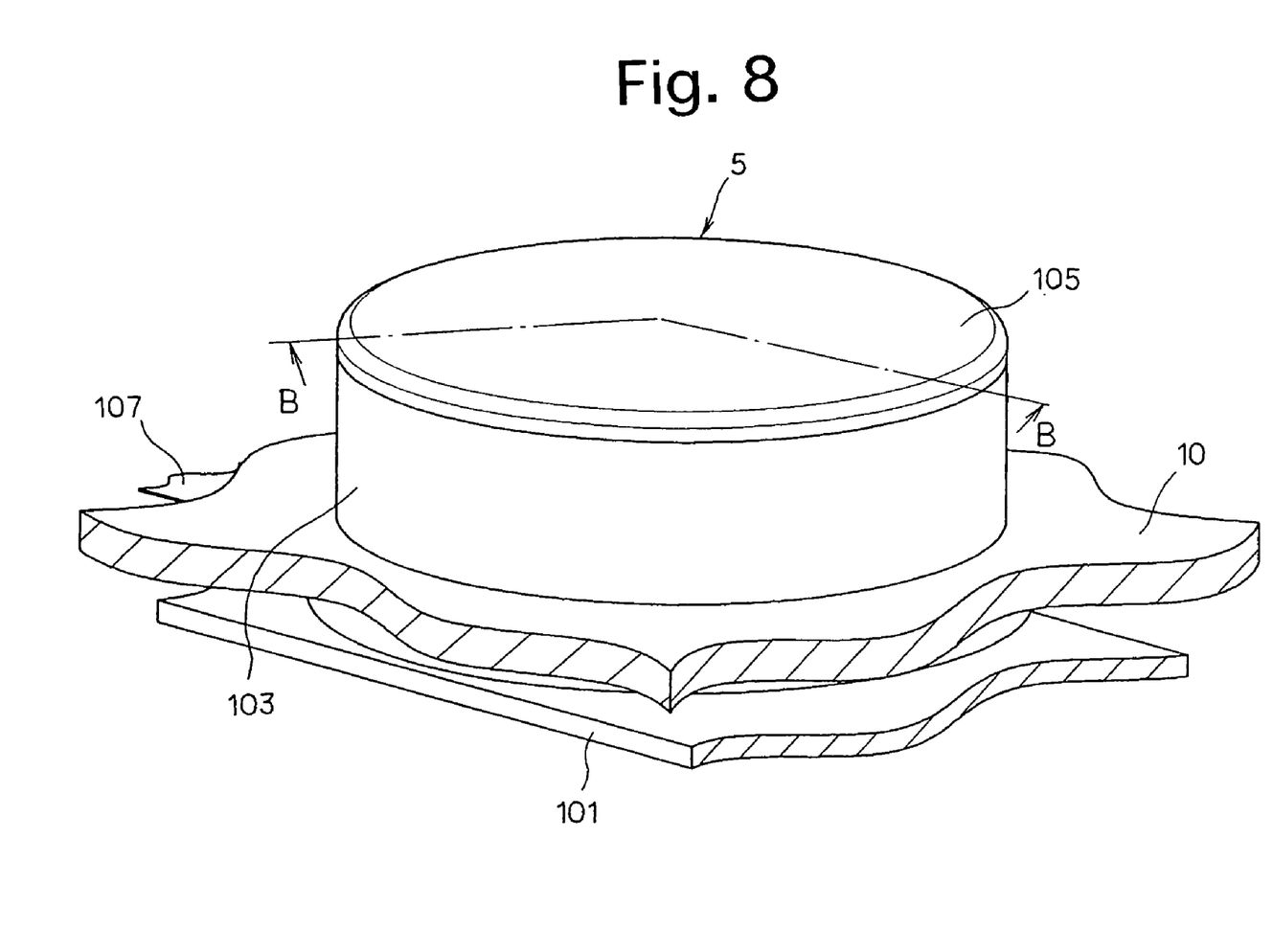
FIG. 8 is a view similar to that of FIG. 2, showing a second embodiment of the mode select dial provided on the digital camera.
Figure 9:
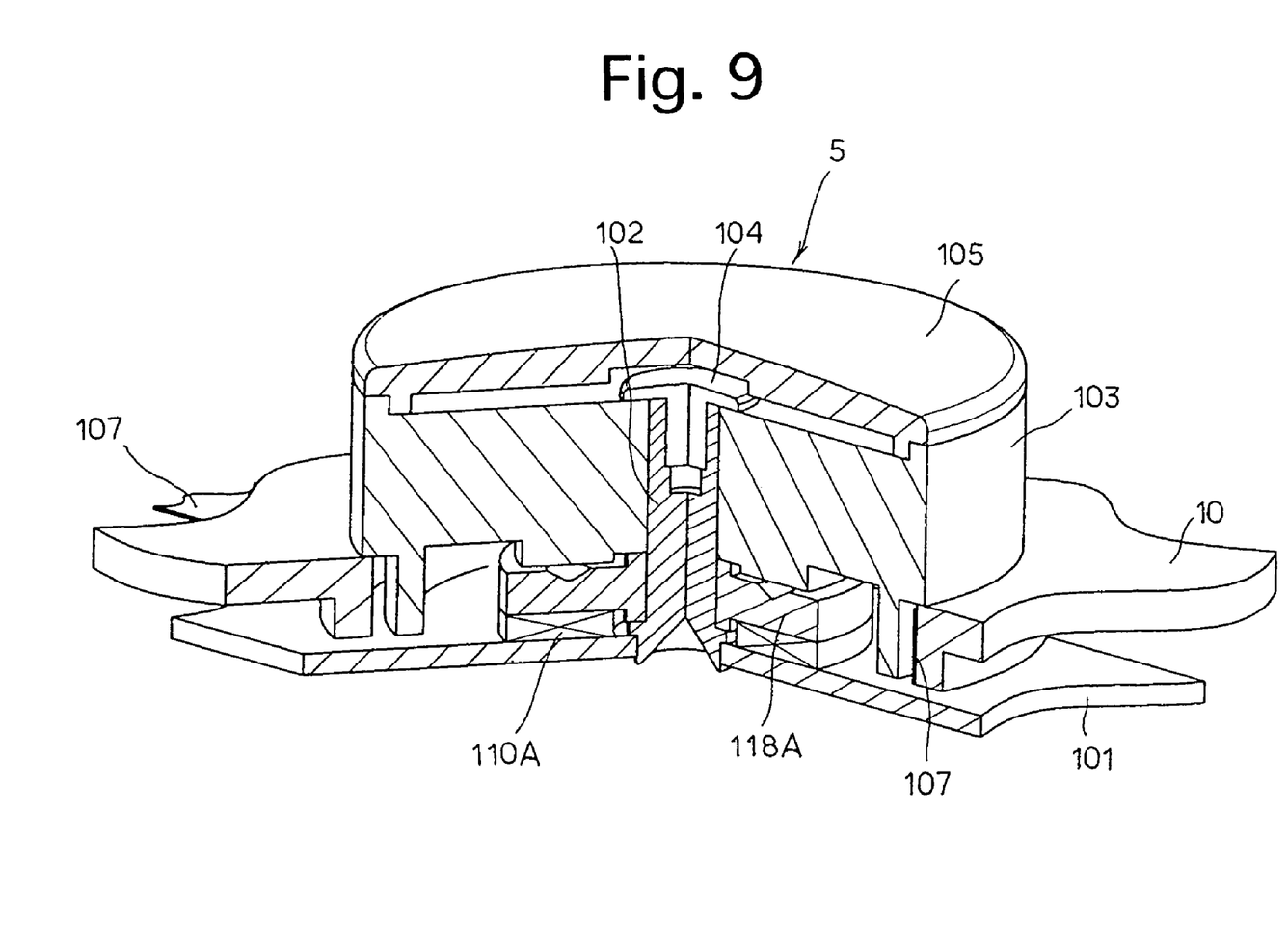
FIG. 9 is a cutaway perspective view, partly in cross section taken along B-B, line in FIG. 8, of the mode select dial shown in FIG. 8.
Figure 10:
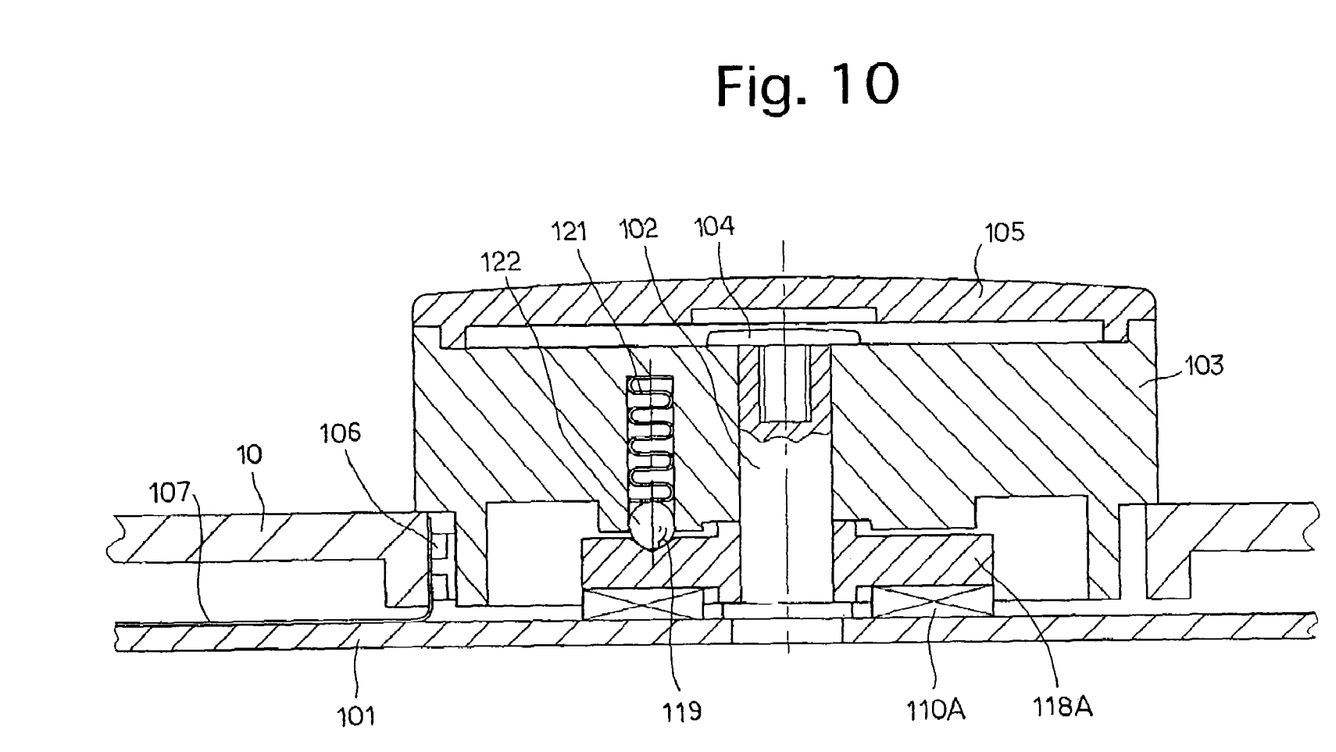
FIG. 10 is a cross sectional view of the mode select dial shown in FIGS. 8 and 9.

FIG. 8 is a cutaway perspective view of a portion of the digital camera shown in FIG. 1, showing a second embodiment of the mode select dial 5. FIG. 9 is a cutaway perspective view, partly in cross section taken along B-B line in FIG. 8, of the mode select dial 5, wherein substantially one third (120 degrees) of the mode select dial 5 is cut away. FIG. 10 is a cross sectional view of the second embodiment of the mode select dial 5. The structure of the second embodiment of the mode select dial 5 is basically the same as the structure of the first embodiment of the mode select dial 5, and accordingly elements and portions of the second embodiment of the mode select dial 5 which are similar to those of the first embodiment of the mode select dial 5 are designated by the same reference numerals and will not be discussed hereinafter. In the second embodiment of the mode select dial 5, an ultrasonic motor consisting of a piezoelectric vibrator 110A and a disc member 118A (which serves as a rotor) is used as a driving source of the dial driving system 212 instead of the DC motor 110 used in the first embodiment of the mode select dial 5. The ultrasonic motor is a conventional type, and the principle of operation of the ultrasonic motor will not be discussed hereinafter. The piezoelectric vibrator 110A is positioned immediately below the disc member 118A and fixed to the internal wall 101 so that the lower surface of the disc member 118A presses the upper surface of the piezoelectric vibrator 110A.

Similar to the first embodiment of the mode select dial 5, in the second embodiment of the mode select dial 5, only the dial body 103 can rotate on the primary shaft 102 relative to the clutch gear 118 in a disengaged state of the clutch mechanism to thereby make it possible to change the exposure or setting mode when the dial body 103 of the mode select dial 5 is manually rotated since the disc member 118A is prevented from rotating relative to the piezoelectric vibrator 110A when the dial body 103 of the mode select dial 5 is manually rotated. Moreover, the dial body 103 rotates together with the disc member 118A via the engaging force of the click ball 122 with the currently-associated click hole 119 in an engaged state of the clutch mechanism to thereby make it possible to change the exposure or setting mode when the mode select button 7 is operated since the disc member 118A is rotated by vibrations of the piezoelectric vibrator 110A when the mode select button 7 is pressed.

In the above described second embodiment of the mode select dial 5, the mode select dial 5 can be made thin, compact and lightweight by the adoption of the ultrasonic motor. Although the second embodiment of the mode select dial 5 adopts a rotary type of ultrasonic motor, this type of ultrasonic motor can be replaced by a linear type of ultrasonic motor.

In the first embodiment of the mode select dial 5, the DC motor can be replaced by a stepper motor.

Although a click mechanism which serves as a clutch for making the clutch gear (rotatable member) 118 or the disc member (rotatable member) 118A engaged and disengaged with and from the dial body 103 is a type of friction clutch in the above illustrated first and second embodiments, such a clutch can be modified in a manner that contacting surfaces of the rotatable members and the dial body which are in contact with one another can be formed as high-friction surfaces by, e.g., affixing a high-friction material to each of the contacting surfaces. Additionally, the frictional clutch can be replaced by an electromagnetic clutch which operates in association with the operation of the mode select button 7.

Although the slidable contact brush 106 is fixed to a portion of the outer peripheral surface of the dial body 103 while the pattern of conductors 108 is provided on the cylindrical-shaped portion 107a of the flexible PWB 107 in each of the above illustrated first and second embodiments of the mode select dial 5, it is possible that the slidable contact brush can be fixed to a portion of the outer edge of a lower surface of the dial body 103 and that the pattern of conductors can be formed on a circuit board which is disposed to lie flat on an upper surface of the internal wall 101.

The present invention is not limited solely to each of the above described first and second embodiments of the mode select dial 5, and can be applied to any other dial or dial switch used for another purpose as long as the dial that is manually rotated can be modified so that the dial can also be rotated by motor by operating either a particular button or switch.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera comprising:
a manually rotatable dial body provided on a camera body; and
a manual operation device, provided on the camera body separately from the dial body, that rotates the dial body.

2. The camera according to claim 1, further comprising:
a dial position detector that detects a rotational position of the dial body; and
an indicator that visually indicates information on the rotational position of the dial body which is detected by the dial position detector, wherein the manual operation device is provided on the camera body at a position so as to be capable of being operated while allowing a user to view both the manual operation device and the information on the indicator at the same time.

3. The camera according to claim 2, wherein the dial body is provided on top of the camera body, and
the manual operation device and the indicator are provided on a back surface of the camera body.

4. The camera according to claim 2, wherein the dial position detector comprises:
a slidable contact brush fixed to a portion of a periphery of the dial body; and
a wiring board provided along a circumference of the dial body and having a pattern of conductors with which the slidable contact brush comes into sliding contact, wherein a state of conduction among the conductors changes in accordance with a change in the rotational position of the dial body.

5. The camera according to claim 4, wherein the wiring board comprises a flexible printed wiring board.

6. The camera according to claim 2, wherein the indicator comprises an LCD which indicates object images captured by an image pick-up device.

7. The camera according to claim 6, wherein the manual operation device comprises a manual operation button positioned in a close vicinity of the LCD.

8. The camera according to claim 1, wherein the dial body serves as a mode select dial for selecting a desired mode from among a plurality of modes.

9. The camera according to claim 8, wherein the plurality of modes comprise different exposure modes and different setting modes.

10. The camera according to claim 1, wherein the camera is a digital camera having an image pick-up device.

11. A camera comprising:
a manually rotatable dial body provided on an outer surface of a camera body
a dial driving device that drives the dial body; and
a manual operation device that actuates the dial driving device.

12. The camera according to claim 11, further comprising:
a dial position detector that detects a rotational position of the dial body; and
an indicator that visually indicates information on the rotational position of the dial body which is detected by the dial position detector,
wherein the manual operation device is provided on the camera body at a position so as to be capable of being operated while allowing a user to view both the manual operation device and the information on the indicator at the same time.

13. The camera according to claim 12, wherein the dial position detector comprises:
a slidable contact brush fixed to a portion of a periphery of the dial body; and
a wiring board provided along a circumference of the dial body and having a pattern of conductors with which the slidable contact brush comes into sliding contact, wherein a state of conduction among the conductors changes in accordance with a change in the rotational position of the dial body.

14. The camera according to claim 12, wherein the dial body is provided on top of the camera body, and
the manual operation device and the indicator are provided on a back surface of the camera body.

15. The camera according to claim 11, further comprising a clutch that engages and disengages the dial driving device with the dial body to allow rotation of the dial driving device to be transferred to the dial body and to prevent the rotation of the dial driving device from being transferred to the dial body, respectively.

16. The camera according to claim 15, wherein the clutch comprises:
a rotatable member rotated by the dial driving device;
a plurality of recesses formed circumferentially on one of the rotatable member and the dial body; and
a click ball provided on the other of the rotatable member and the dial body to be selectively engaged in the plurality of recesses via a biasing device.

17. The camera according to claim 16, wherein the rotatable member comprises a gear positioned immediately below the dial body.

18. The camera according to claim 16, wherein the dial driving device comprises a motor that drives the dial body, and
the rotatable member comprises a gear positioned immediately below the dial body to be engaged with the motor via at least one reduction gear.

19. The camera according to claim 16, wherein the biasing device comprises a compression coil spring accommodated in an accommodation hole formed on the dial body.

20. The camera according to claim 11, wherein the dial driving device comprises one of a DC motor and a stepper motor which rotates the dial body via a gear mechanism.

21. The camera according to claim 11, wherein the dial driving device comprises an ultrasonic motor, positioned coaxially with the dial body, for directly driving the dial body.

22. The camera according to claim 11, wherein the dial body serves as a mode select dial for selecting a desired mode from among a plurality of modes.

23. The camera according to claim 22, wherein the plurality of modes comprise different exposure modes and different setting modes.

24. The camera according to claim 12, wherein the indicator comprises an LCD which indicates object images captured by an image pick-up device.

* * * * *